United States Patent
Godfrey et al.

(10) Patent No.: US 10,108,922 B2
(45) Date of Patent: Oct. 23, 2018

(54) METHODS AND SYSTEMS FOR DETECTING TRANSPORTATION RELAYS

(71) Applicant: R&L Carriers, Inc., Wilmington, OH (US)

(72) Inventors: Timothy S. Godfrey, Xenia, OH (US); Chris Deck, Wilmington, OH (US)

(73) Assignee: R & L Carriers, Inc., Wilmington, OH (US)

( * ) Notice: Subject to any disclaimer, the term of this patent is extended or adjusted under 35 U.S.C. 154(b) by 298 days.

(21) Appl. No.: 15/163,154

(22) Filed: May 24, 2016

(65) Prior Publication Data
US 2017/0345314 A1  Nov. 30, 2017

(51) Int. Cl.
| | |
|---|---|
| G06Q 10/08 | (2012.01) |
| G01S 19/13 | (2010.01) |
| G01C 21/34 | (2006.01) |
| G08G 1/00 | (2006.01) |
| G01S 19/42 | (2010.01) |
| G01S 5/02 | (2010.01) |

(52) U.S. Cl.
CPC ......... G06Q 10/0833 (2013.01); G01C 21/34 (2013.01); G01S 19/13 (2013.01); G08G 1/202 (2013.01); G01S 5/02 (2013.01); G01S 19/42 (2013.01)

(58) Field of Classification Search
CPC ...... G08G 1/20; G01C 21/34; G06Q 10/0833; G06Q 10/30; G01S 19/13; G01S 19/42; H04W 88/04
USPC ..... 340/431, 539.13, 539.23, 988, 989, 991, 340/992, 994, 995.17; 235/382, 384; 364/436, 443; 701/519; 705/333
See application file for complete search history.

(56) References Cited

U.S. PATENT DOCUMENTS

| | | | |
|---|---|---|---|
| 5,880,958 | A  | 3/1999  | Helms et al. |
| 6,142,372 | A  | 11/2000 | Wright |
| 7,273,172 | B2 | 9/2007  | Olsen, III et al. |
| 7,484,663 | B2 | 2/2009  | Olsen, III et al. |

(Continued)

FOREIGN PATENT DOCUMENTS

WO    2011020191 A1    2/2011

OTHER PUBLICATIONS

Xlerate, Real Time Tracking, http://www.xlerate.co.nz/Xlerate/RealTimeTracking.aspx, accessed May 12, 2016.
(Continued)

Primary Examiner — Hung T Nguyen
(74) Attorney, Agent, or Firm — Dinsmore & Shohl LLP (57) ABSTRACT

Methods and systems for determining that a transportation relay has occurred are disclosed. Systems include a first tracking device configured to track a location of a first load; a second tracking device configured to track a location of a second load; and a central computing device. The central computing device is configured to receive the location of the first load from the first tracking device; identify a stop event for the first load based on the location of the first load; receive the location of the second load from the second tracking device; identify a stop event for the second load based on the location of the second load; determine that the stop event for the first load and the stop event for the second load are within a predetermined proximity; and determine that the transportation relay has occurred.

24 Claims, 4 Drawing Sheets

(56) References Cited

U.S. PATENT DOCUMENTS

| | | |
|---|---|---|
| 7,755,518 B2 | 7/2010 | Hersh et al. |
| 2002/0103728 A1 | 8/2002 | Naghshineh et al. |
| 2005/0261832 A1 | 11/2005 | Arnouse |
| 2005/0278063 A1 | 12/2005 | Hersh et al. |
| 2006/0178812 A1* | 8/2006 | Affleck .................. G06Q 10/08 701/533 |
| 2008/0140597 A1 | 6/2008 | Satir et al. |
| 2009/0030770 A1 | 1/2009 | Hersh et al. |
| 2009/0045924 A1 | 2/2009 | Roberts, Sr. et al. |
| 2009/0125350 A1 | 5/2009 | Lessing et al. |
| 2009/0189788 A1* | 7/2009 | Faus ...................... G08B 25/08 340/989 |
| 2016/0019497 A1* | 1/2016 | Carvajal ............... G06Q 10/08 701/519 |

OTHER PUBLICATIONS

Carrier Logistics Inc. Solutions FACTS Highway—Linehaul Dispatch, http://www.carrierlogistics.com/solutions/trucking-linehaul-dispatch.asp, accessed May 12, 2016.

Bergan, Terry, et al. Its Technology for Intermodal Port Applications, http://www.ird.ca/library/pdf/itsworldcongress2001-intermodalfreight.pdf, accessed May 12, 2016.

* cited by examiner

METHODS AND SYSTEMS FOR DETECTING TRANSPORTATION RELAYS

TECHNICAL FIELD

The present invention generally relates to methods and systems for identifying transportation relays and, more specifically, for determining whether a transportation relay has occurred.

BACKGROUND

In some transportation arrangements, drivers meet at a prearranged location and exchange trailer(s) including freight. For example, a load being transported from Florida to New York may be picked up in Florida by a first driver and transferred from the first driver to a second driver in North Carolina. The second driver may then take the load from North Carolina to New York. On some occasions, the first driver may also pick up a trailer for transport back to Florida. These exchanges are typically done to reduce the distance an individual driver must travel before returning to his home terminal or place of residency. The transfer of the load from one driver to another driver is generally referred to as a "transportation relay."

Conventionally, a time and location for the transportation relay is scheduled to be approximately halfway between the home terminals for each driver. Delayed relays can impact other relays, movement of other shipments, and the estimated return time to the home terminal. Thus, relay delays may have a ripple effect through an entire transportation network.

Therefore, a need exists for a systems and methods to automatically determine when a transportation relay has occurred. Additionally, automatic updating of route plans based on the determination that a transportation relay has occurred is also needed.

SUMMARY

In one embodiment, a system for determining that a transportation relay has occurred includes a first tracking device configured to track a location of a first load; a second tracking device configured to track a location of a second load; and a central computing device. The central computing device is configured to receive the location of the first load from the first tracking device; identify a stop event for the first load based on the location of the first load; receive the location of the second load from the second tracking device; identify a stop event for the second load based on the location of the second load; determine that the stop event for the first load and the stop event for the second load are within a predetermined proximity; and determine that the transportation relay has occurred.

In another embodiment, a method for determining that a transportation relay has occurred includes receiving a location of a first load from a first tracking device; identifying a stop event for the first load based on the location of the first load; receiving a location of a second load from a second tracking device; identifying a stop event for the second load based on the location of the second load; and determining that the transportation relay has occurred responsive to determining that the stop event for the first load and the stop event for the second load are within a predetermined proximity.

In still another embodiment, a computer-implemented method includes receiving location data pertaining to a first vehicle from a first tracking device; identifying a stop event for the first vehicle based on the location data pertaining to the first vehicle; receiving location data pertaining to a second vehicle from a second tracking device; identifying a stop event for the second vehicle based on the location data pertaining to the second vehicle; determining a distance between the stop event for the first load and the stop event for the second load; and determining that the transportation relay has occurred responsive to determining that the distance between the stop event for the first vehicle and the stop event for the second vehicle is less than a predetermined threshold distance.

In some embodiments, time is used to determine that the transportation relay has occurred. In such embodiments, a method for determining that a transportation relay has occurred includes receiving location data pertaining to a first load from a first tracking device; identifying a stop event for the first load based on the location data pertaining to the first load; receiving location data pertaining to a second load from a second tracking device; identifying a stop event for the second load based on the location data pertaining to the second load; and determining a distance between the stop event for the first load and the stop event for the second load. The method further includes determining a time period between the stop event for the first load and the stop event for the second load and determining that the transportation relay has occurred responsive to determining that the distance between the stop event for the first load and the stop event for the second load is less than a predetermined threshold distance and responsive to determining that the time period between the stop event for the first load and the stop event for the second load is less than a predetermined threshold time period. In some embodiments, the method determines that the stop events are within the predetermined time period responsive to determining that the time of the stop event of the first load is substantially the same as the time of the stop event of the second load (i.e., the stop events overlap in time).

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION

The embodiments described herein generally relate to methods and systems for determining whether a transportation relay has occurred and, more specifically, for determining whether a transportation relay has occurred based on locations and stop events for first and second loads.

Figure 1:
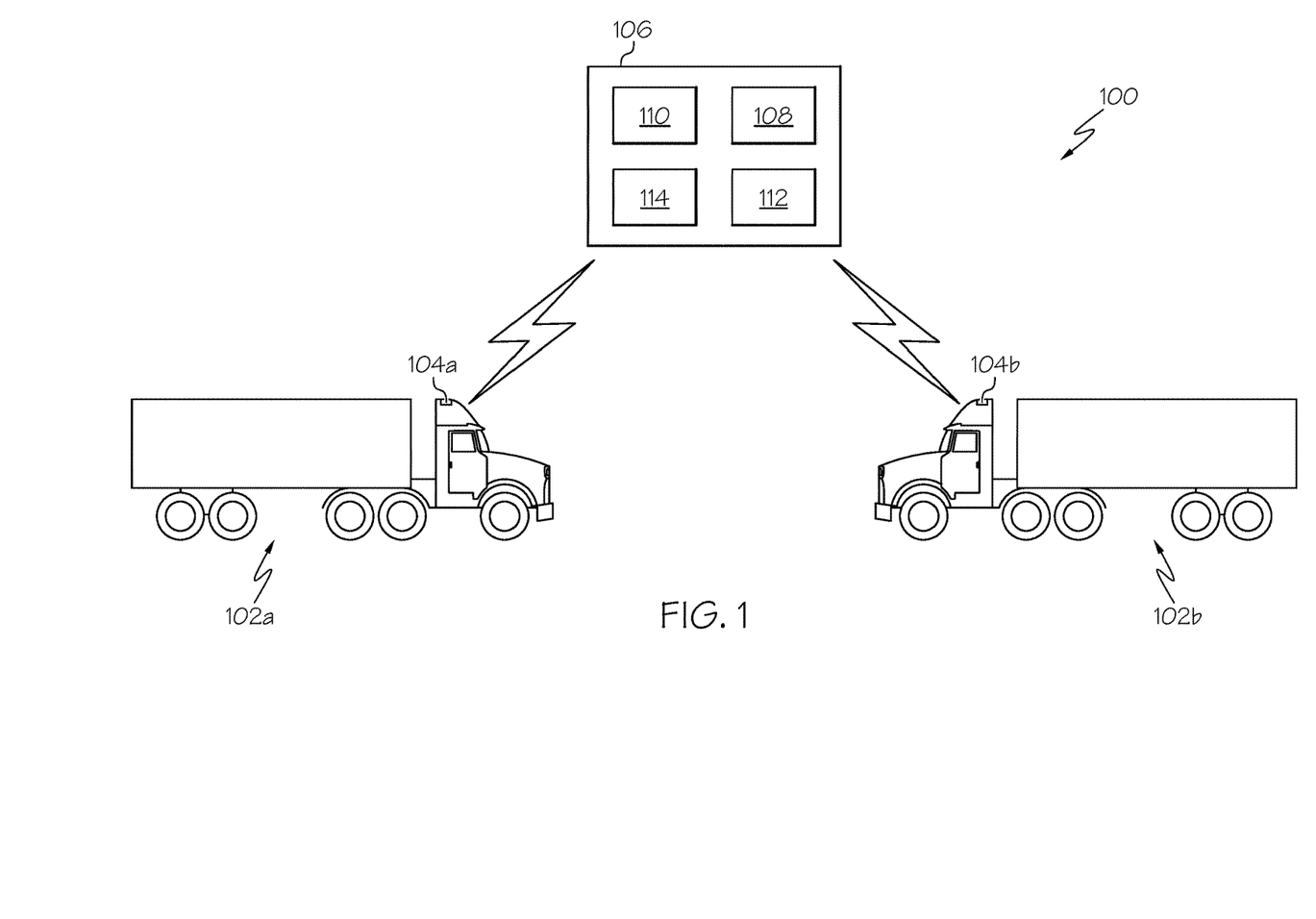
FIG. 1 depicts a system for detecting a transportation relay according to one or more embodiments shown and described herein.

FIG. 1 depicts an exemplary system 100 which may determine that a transportation relay has occurred between a first load 102a and a second load 102b. A brief description of the system components is described below. Each load 102 may have a tracking device 104 associated with it to provide location information. For example, the first load 102a includes tracking device 104a and the second load 102b includes tracking device 104b. Continuing to refer to FIG. 1, the system 100 may further include a central computing device 106 which receives information from the loads 102. The central computing device 106 may further transmit information to each load 102, perform various calculations and make determinations about routes and milestones, and provide updates regarding routes, locations, and the like, as will be described in greater detail below. What is meant by receiving information from the loads and transmitting information to the loads is that the central computing device 106 is communicatively coupled to one or more devices associated with the first and/or second loads (e.g., the first tracking device 104a, the second tracking device 104b, an onboard computing device, etc.) such that information can be transmitted to and received from the one or more devices associated with the load. A detailed description of these components is now provided.

The loads 102 may include, for example, a transportation vehicle (e.g., a tractor), a trailer, or cargo. Each of the loads 102 depicted in FIG. 1 is a transportation vehicle coupled to a single trailer, although it is contemplated that in some embodiments, one of the transportation vehicles may not be coupled to a trailer, or one or more of the transportation vehicles may be coupled to multiple trailers. In addition, it is contemplated that additional types of vehicles besides tractors may be employed, depending on the particular embodiment.

Each load 102 is associated with at least one tracking device 104. The tracking device 104 may be, by way of example and not limitation, a GPS receiver, cellular network radio, radio transmitter, or the like. In some embodiments, the location tracking device may determine its location and transmit the location information, or it may transmit raw location data to another computing device, such as central computing device 106, which may calculate the location of the location tracking device 104 using any suitable method. For example, in embodiments in which the tracking device 104 is a GPS receiver, the tracking device 104 may transmit its GPS coordinates. However, in embodiments in which the tracking device 104 is a cellular network radio, the tracking device 104 may transmit information to enable another computing device to determine the location of the tracking device 104 using cellular network triangulation. Alternatively, the tracking device 104 may be enabled to perform cellular network triangulation and transmit its location to another computing device, such as central computing device 106.

Although the tracking devices 104a and 104b are depicted in FIG. 1 as being positioned on the top of the corresponding transportation vehicle, it should be understood that the tracking device may be associated with the load 102 in a variety of locations, including within the cab of the tractor, underneath the tractor, on or within the trailer, associated with the cargo, or in another location, depending on the particular embodiment. In some embodiments, the position of the tracking device 104 may depend on the type of tracking device 104 and the transmission capabilities of the tracking device 104. For example, some types of tracking devices may be positioned external to the vehicle or near a window of the vehicle to provide for enhanced reception and transmission.

Each tracking device 104 is communicatively coupled to the central computing device 106. In some embodiments, each tracking device 104 may include wireless communication components to enable the tracking device 104 to communicate directly with the central computing device 106. In other embodiments, the tracking device 104 may be associated with another computing device, such as an onboard computing device, which includes wireless communication components to communicate with the central computing device 106. For example, the tracking device 104 may be located within an onboard computing device, connected to an onboard computing device via wires or a close-range wireless communications protocol, such as Bluetooth®, or the like. Accordingly, the tracking device 104 may communicate with the central computing device 106 directly or indirectly, depending on the particular embodiment.

The central computing device 106 may be remotely located from each of the loads 102. For example, the central computing device 106 may be located at a transportation terminal, a warehouse, a data center, in an office building, or the like. In various embodiments, the central computing device 106 is communicatively coupled to various loads in a fleet and is configured to manage the routes for the fleet and provide route and status information to managers, drivers, and customers. Route information may include, by way of example and not limitation, an expected location and/or time for an anticipated transportation relay, an estimated time of arrival (ETA) for the transportation vehicle at a particular location, previous stop information, planned stop information (i.e., stops in which a driver is scheduled), information regarding an order in which a driver completed stops, information regarding an order of planned stops, and the like. Information may be provided to managers, drivers, and customers in a variety of ways, including displaying the information on a web page, providing a report, or causing the information to be displayed on a display device associated with the central computing device 106 or another computing device communicatively coupled to the central computing device 106.

The central computing device 106 generally includes one or more processors 108, a memory 110, a database 112, and communication components 114. The central computing device 106 may be configured in a variety of ways, such as a desktop computer, a mobile station, a wireless phone, and so forth. Moreover, the central computing device 106 may include one or more entities. For example, the central computing device 106 may be a single computing device or a plurality of computing devices, such as a server farm or cloud-based computing device.

The processor(s) 108 may include semiconductor(s), transistors such as electronic integrated circuits, and the like, and are not limited by the materials from which they are formed or the processing mechanisms they employ. While a single processor 108 is depicted, the processor 108 may be representative of multiple processors operable to perform various tasks associated with route management and transportation relay detection. Additionally, although FIG. 1 depicts a single memory 110, it is contemplated that a wide variety of types and combinations of memory may be employed. The memory 110 may include, by way of example and not limitation, random access memory (RAM), flash memory, hard disk memory, video memory, removable medium memory, and other types of computer-readable media. As will be described in greater detail hereinbelow, the memory 110 may store code that is executable by the processor 108 to enable the central computing device 106 to perform various tasks associated with route management and transportation relay detection.

The database 112 maintains a library of route information for one or more loads in a fleet. For example, the database 112 may include route information for each load managed by, under the direction of, or otherwise associated with a company that controls the central computing device 106. In some embodiments, such as the embodiment depicted in FIG. 1, the database 112 may be located on the central computing device 106, although it is contemplated that the database may be located remote from the central computing device 106 while remaining accessible to the central computing device 106. For example, the database 112 may be an enterprise database management system or "cloud" hosted system, and the like, which may be electrically coupled to the central computing device 106 via a computer network, such as Ethernet or the Internet.

The communication components 114 may include various components to provide communications functionality, including wired and/or wireless communication. Accordingly, the communication components 114 may include components that provide communication functionality, such as receiving and transmitting of information. The particular communication components 114 employed will vary depending on the particular embodiment, and in general, enable the central computing device 106 to communicate with (e.g., transmit information to and receive information from) at least the transportation vehicles 102. In some embodiments, for example, the communication components 114 may include radio or other wireless communication components through which location data, route data, and other information can be transmitted. In one embodiment, the communication components 114 may enable the central computing device 106 to communicate via a wireless network, such as Bluetooth®, Zigbee®, a wireless computer network (i.e., IEEE 802.11), or a cellular-data network, etc. In another embodiment, communication components may enable the central computing device 106 to communicate via a wired network, such as Ethernet or a proprietary network. It is contemplated that the communication components 114 may enable the central computing device 106 to communicate via a combination of one or more networks.

Figure 2:
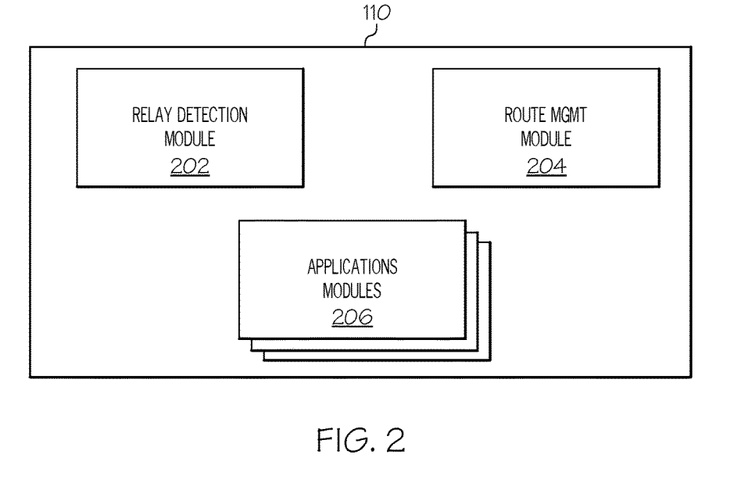
FIG. 2 depicts an example memory for storing various modules configured to implement methods for detecting a transportation relay according to one or more embodiments shown and described herein.

Turning now to FIG. 2, additional detail regarding the memory 110 will now be provided. As shown in FIG. 2, the memory 110 includes various modules including relay detection module 202, route management module 204, and one or more additional applications modules 206. The relay detection module 202 is representative of the functionality of the central computing device 106 that is operable to determine whether a transportation relay has occurred. In particular, the relay detection module 202 may operate to receive location information for the first and second loads, identify stop events for the loads, and determine that a transportation relay has occurred.

The route management module 204 is representative of the functionality of the central computing device 106 that is operable to manage transportation routes for one or more loads communicatively coupled to the central computing device 106. In particular, the route management module 204 may operate to access route data stored on the database 112, update a route for one or more loads, and/or provide an output in the form of information regarding a location of a load. In various embodiments, the route management module 204 may operate to modify one or more routes responsive to detection of a transportation relay. Modification of one or more routes may be, by way of example and not limitation, updating an estimated time of arrival (ETA) for one or more loads at a particular location, such as a final destination for a trailer or freight associated with the transportation vehicle. The route management module 204 may also be operable to retrieve information from the database 112 and cause information to be stored in the database 112.

Additional applications modules 206 are representative of additional functionalities of the central computing device 106. For example, additional applications modules 206 may represent functionality of the central computing device 106 to provide various types of outputs, such as updates or alerts, to other computing devices communicatively coupled to the central computing device 106. Applications modules 206 may further include functionalities that enable the central computing device 106 to communicate with and/or facilitate operation of peripheral devices associated with the central computing device 106, such as display devices, printers, memory card readers, and the like.

Figure 3:
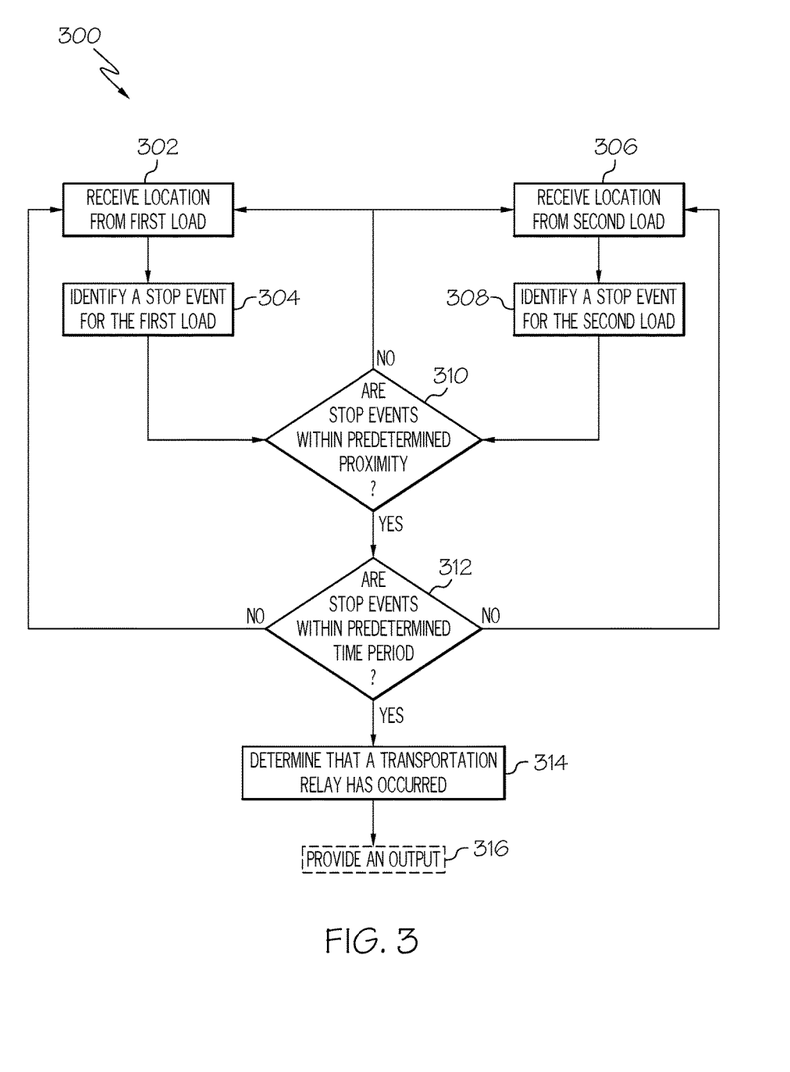
FIG. 3 depicts an example method for determining that a transportation relay has occurred according to one or more embodiments shown and described herein.

Turning now to FIG. 3, an embodiment of a method 300 for determining that a transportation relay has occurred is depicted. The method 300 may be performed, for example, by the relay detection module 202 on the central computing device 106. First, the relay detection module 202 receives a location from a first load (step 302). The location may be received, for example, from the location tracking device 104a associated with the first load 102a. As described hereinabove, the "location" may be received as an actual location, or may be received as data sufficient to enable the central computing device 106 to determine a location for the first load 102a. As but one example, the central computing device 106 may receive information sufficient to perform triangulation methods to determine a location of the first load.

Next, at step 304, the relay detection module 202 identifies a stop event for the first load. As used herein, a "stop event" refers to a stop for a load, such as during delivery, pick up, or a transportation relay. The stop event may be identified via a number of methods, some of which are described in greater detail hereinbelow. In various embodiments, a stop event may be identified based on the location information received from the location tracking device 104.

The relay detection module 202 additionally receives a location from a second load (step 306) and identifies a stop event for the second load (step 308). Steps 306 and 308 may be conducted in the same or a similar manner as steps 302 and 304, respectively, or may be performed according to different methods, depending on the particular embodiment. For example, the location for the second load 102b may be computed by the central computing device 106 based on location data received at step 306, while the location for the load 102a may be received in a useable format from the first location tracking device 104a. Moreover, steps 306 and 308 may be performed before steps 302 and 304, substantially simultaneously with steps 302 and 304, or after steps 302 and 304, depending on the particular embodiment.

Next, at step 310, the relay detection module 202 will determine if the stop events for the first and second loads are within a predetermined proximity. The predetermined proximity may be a range of distances, or may be a threshold distance between stop events. For example, if the distance between stop events is below the threshold distance, the relay detection module 202 may determine that the stop events are within a predetermined proximity. The predetermined proximity may be, for example, within about 200 meters, within about 100 meters, within about 50 meters, or the like. In some embodiments, the predetermined proximity may be from about 1 meter to about 200 meters, from about 5 meters to about 100 meters, or from about 10 meters to about 50 meters. The relay detection module 202 may, in some embodiments, determine that the stop events are within the predetermined proximity responsive to determining that the location of the first load is substantially the same as the location of the second load. In such embodiments, the relay detection module 202 may determine that the locations are substantially the same based on the precision and accuracy associated with each of the location tracking devices. In various embodiments, the relay detection module 202 may determine if the stop events for the first and second loads are within a predetermined proximity by comparing the location of the first load with the location of the second load.

In other embodiments, the relay detection module 202 may determine if the stop events are within a predetermined proximity based on additional information received from the first and/or second loads. For example, when the loads are within a predetermined proximity, one or both of the loads may sense the other load and transmit information to the central computing device 106. As but one example, when the first and second loads are within a predetermined proximity of one another, they may connect via Bluetooth communication and one or both of the loads may transmit the location to the central computing device 106. Other methods for determining whether the loads are within a predetermined proximity may be employed, depending on the particular embodiment.

If the stop events are not within the predetermined proximity (e.g., a "no" at step 310), the method 300 returns to the beginning and awaits new location information. However, if the stop events are within the predetermined proximity (e.g., a "yes" at step 310), the relay detection module 202 determines whether the stop events occurred within a predetermined time period (step 312). The occurrence of the stop events within a predetermined time period may be indicative, for example, of stop events that overlap, such as when a first transportation vehicle is waiting for a second transportation vehicle to which the trailer and/or cargo will be transferred.

At step 312, the relay detection module 202 will determine if the stop events for the first and second loads occurred within a predetermined time period. In various embodiments, the relay detection module 202 may determine if the stop events for the first and second loads are within a predetermined time period by comparing the time of the stop event of the first load with the time of the stop event of the second load. The "time" for a stop event may be a point in time during which the stop event occurred, such as a time when the load begins a stop event (e.g., 1:04 pm), or it may be a time period during which the load has stopped (e.g., from 2:00 pm to 4:00 pm). For example, the relay detection module 202 may determine a time period between the first stop event and the second stop event and determine whether the time period between the stop events is within a predetermined time period. The predetermined time period may be a range of times, or may be a threshold time period between stop events. For example, if the time between stop events is below the predetermined threshold time period, the relay detection module 202 may determine that the stop events are within a predetermined time period. The predetermined threshold time period may be, for example, about 2 hours, about 1 hour, about 30 minutes, or the like. In some embodiments, the predetermined time period may be from about 10 seconds to about 2 hours, from about 30 seconds minute to about 1 hour, or from about 1 minutes to about 30 minutes. The relay detection module 202 may, in some embodiments, determine that the stop events are within the predetermined time period responsive to determining that the time of the stop event of the first load is substantially the same as the time of the stop event of the second load.

In embodiments in which the time for a stop event is measured as a time period over which the stop event has occurred, the relay detection module 202 may determine that the stop events are within the predetermined time period responsive to determining that the stop events overlap in time. For example, the relay detection module 202 may determine that the stop event for the first load occurred from 1:05 pm until 3:15 pm and that the stop event for the second load occurred from 2:30 pm until 4:10 pm. Therefore, the relay detection module 202 determines that the stop events for the first and second loads overlapped from 2:30 pm until 3:15 pm. Accordingly, the relay detection module 202 may determine that the stop events are within the predetermined time period.

If the stop events are not within the predetermined time period (e.g., a "no" at step 312), the method 300 returns to the beginning and awaits new location information. However, if the stop events are within the predetermined time period (e.g., a "yes" at step 312), the relay detection module 202 determines that a transportation relay has occurred at step 314.

Although the method depicted in FIG. 3 determines that a transportation relay has occurred based on time and location constraints, it is contemplated that in some embodiments, additional constraints may be employed to determine the occurrence of a transportation relay. For example, in some embodiments, route information may be employed to verify that a transportation relay is scheduled to occur between the loads. Additionally, in some embodiments, the determination that a transportation relay has occurred may be based on location constraints with or without time or other constraints.

Once the relay detection module 202 has determined that a transportation relay has occurred, in some embodiments, the relay detection module 202 may provide an output at step 316. The output may be, by way of example and not limitation, information regarding a shipment identification, a route identification, a location of the transportation relay, a time of the transportation relay, or the like. In some embodiments, the output may be provided as a notification or alert transmitted to another computing device. In other embodiments, the output may be in the form of a message that is displayed on a display device associated with the central computing device 106 or another computing device. In still other embodiments, the output may be in the form of data to be stored in a database, such as database 112. For example, the output may cause the time or location of the transportation relay to be stored in the database 112. In other embodiments, the output may be an update to one or more routes. For example, responsive to determining that a transportation relay has occurred, the central computing device 106 may update route information (including, but not limited to, updating an estimated time of arrival (ETA)) for at least one of the first or second loads.

Figure 4:
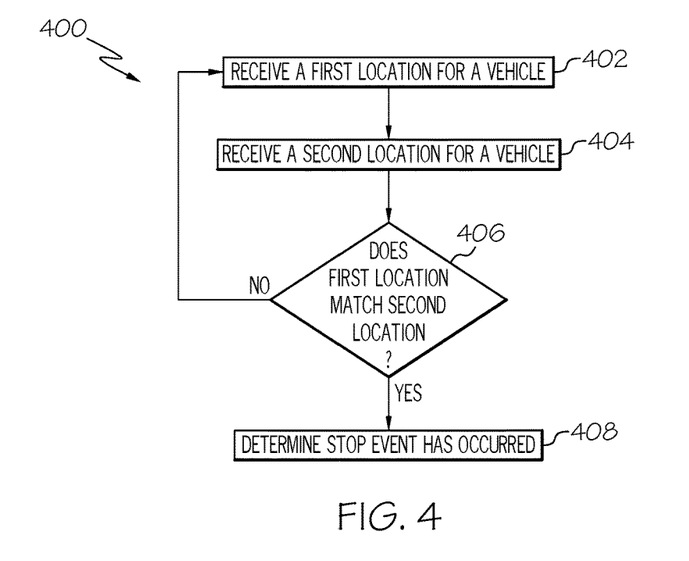
FIG. 4 depicts an example method for determining that a stop event has occurred according to one or more embodiments shown and described herein.

FIG. 4 depicts one embodiment of a method 400 for determining that a stop event has occurred. The method 400 may be performed by the relay detection module 202 on the central computing device 106. In method 400, the relay detection module 202 receives a first location for a load at step 402. Then, the relay detection module 202 receives a second location for the load at step 404. As described herein above and below, the received locations may be actual locations or data that enables the central computing device 106 to determine a location for the load. The location information may be received, for example, from a location tracking device associated with the load.

At step 406, the relay detection module 202 determines if the first location matches the second location. A "match" may be identified, for example, if the locations are identical, substantially the same (within a predetermined range of error), or within a predetermined proximity. A match may be identified, by way of example and not limitation, when the first and second locations are within about 200 meters, within about 100 meters, within about 50 meters, or the like. In some embodiments, a match may be identified when the first and second locations are within about 1 meter to about 200 meters, within about 5 meters to about 100 meters, or within about 10 meters to about 50 meters. In such embodiments, the relay detection module 202 may determine that the locations are a match based on the precision and accuracy associated with the location tracking device associated with the load.

If the locations do not match (e.g., a "no" at step 406), the method 400 returns to step 402 and receives an additional location for the load. The method 400 may continue receiving locations for the load and comparing the received location to a preceding location for the load until a match is identified. Thus, although the locations are described herein as "first location" and "second location," it is to be understood that additional locations may be received and the locations are compared to preceding and subsequent locations in order to determine whether the load has ceased movement.

When the relay detection module 202 determines that the first and second locations match (e.g., a "yes" at step 406), the relay detection module 202 determines that a stop event has occurred (step 408). Upon determining that a stop event has occurred, the relay detection module 202 may update route information for the load, record a time or a location of the stop event, or proceed with other methods that may be performed by the relay detection module, including those described above and below.

Figure 5:
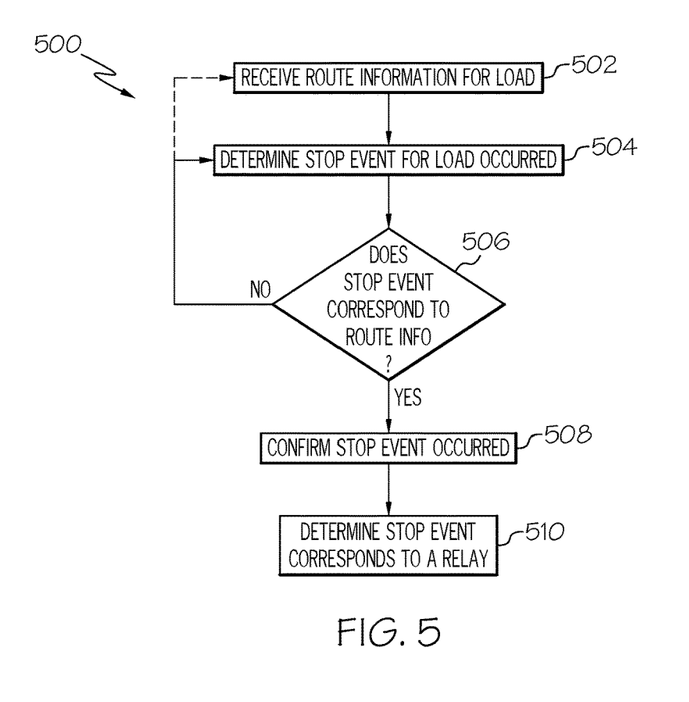
FIG. 5 depicts an example method for confirming that a stop event has occurred according to one or more embodiments shown and described herein.

In various embodiments, the relay detection module 202 confirms that a detected stop event is a stop event. An example method 500 for confirming a stop event is depicted in FIG. 5. As shown in FIG. 5, the relay detection module 202 receives route information for a load at step 502. The route information may be received from the route management module 204, or may retrieved from the database 112. The relay detection module 202 additionally determines that a stop event for the load occurred at step 504. This may be performed in any suitable way, such as by implementing method 400. Although determining that the stop event occurred is depicted in FIG. 5 as occurring after the relay detection module 202 receives route information, it is contemplated that in various embodiments, step 502 may be performed after step 504 or substantially simultaneously with step 504.

Next, at step 506, the relay detection module 202 determines whether the stop event corresponds to the received route information. The relay detection module 202 may, for example, compare a time and/or a location of the determined stop event with one or more stop events identified in the route information. If the relay detection module 202 determines that the stop event does not correspond to the route information (e.g., a "no" at step 506), the method 500 returns to step 504 when another stop event is determined to have occurred. Alternatively, in some embodiments, the method 500 may return to step 502 and receive route information for a load. For example, the relay detection module 202 may receive updated route information for the load from the database 112 or the route management module 204.

However, if the relay detection module 202 determines that the stop event corresponds to the route information for the load (e.g., a "yes" at step 506), the relay detection module 202 confirms that the stop event occurred (step 508). In various embodiments, the relay detection module 202 may confirm that the stop events for each of the first load 102a and the second load 102b occurred based at least in part on the route for the first load and the second load, respectively.

Having confirmed that the stop event occurred, at step 510, the relay detection module 202 determines that the stop event corresponds to a transportation relay. In various embodiments, the relay detection module 202 may confirm that the stop event corresponds to a transportation relay scheduled on the route for the load. This verification may, for example, provide confirmation that a transportation relay is to take place and that the stop event does not correspond to another type of stop event, such as a delivery or other pick up.

In some embodiments, the relay detection module 202 utilizes received route information to confirm that the stop event for the first load 102a is related to the stop event for the second load 102b. For example, in addition to confirming that a detected stop event has occurred, the relay detection module 202 may compare the route information to determine that a stop event for the first load 102a is related to the stop event for the second load 102b. A comparison of the route information may include a comparison of times and/or locations of planned stops for each of the loads, or may be performed based on trailer information associated with the route information. Particular methods for determining that the stop events of first and second loads will vary depending on the particular embodiments, and may depend at least in part on information associated with the route information for a particular vehicle, trailer, piece of cargo, or load.

In various embodiments, one or more of the loads further includes equipment configured to identify a trailer hook or trailer unhook event. For example, a sensor may be configured to detect when a towing device for the transportation vehicle is coupled or uncoupled from the corresponding trailer. As another example, a camera associated with the transportation vehicle may be configured to identify when a trailer is coupled to or decoupled from the tractor. Other equipment is contemplated for use in identifying a trailer hook or trailer unhook event. When detected, information regarding the trailer hook or trailer unhook event may be transmitted to the central computing device 106 from the load 102. The information may be transmitted by the same device that identified the trailer hook or trailer unhook event, or the equipment may be configured to transmit the information to another, intermediate computing device for transmission to the central computing device 106. For example, the sensor may be electrically coupled to an onboard computing device located within the transportation vehicle and the onboard computing device may transmit information regarding the trailer hook/unhook event to the central computing device 106. Additional detail regarding identification of trailer hook/unhook events may be found in U.S. Pat. No. 8,179,238, issued May 15, 2012 and entitled "Information Transmission and Processing Systems and Methods for Freight Carriers," the entire contents of which are hereby incorporated by reference.

In embodiments in which trailer hook/unhook event information is transmitted to the central computing device 106, the relay detection module 202 may employ this information in determining that the transportation relay has occurred. For example, the relay detection module 202 may receive information regarding a trailer unhook event from the first load and/or information regarding a trailer hook event from the second load and use this information to determine that the transportation relay has occurred. In some embodiments, the trailer hook/unhook event information may be utilized to confirm a determination that a transportation relay has occurred. For example, the relay detection module 202 may determine that a transportation relay has occurred (such as, by way of example and not limitation, by implementing method 300), and confirm the occurrence of the transportation relay based on information received regarding a trailer hook/trailer unhook event.

In some embodiments, information regarding a trailer hook/unhook event may be utilized to determine that a stop event has occurred. For example, in some embodiments, a stop event may be identified based on the receipt of trailer hook/unhook event information rather than or in addition to location-based information.

In still other embodiments, information regarding trailer hook/unhook events may be utilized to confirm that a stop event for a first load is related to a stop event for a second load. For example, the relay detection module 202 may determine that the stop events are related responsive to receiving information regarding a trailer unhook event from the first load and subsequently receiving information regarding a trailer hook event from the second load. In contrast, the relay detection module 202 may determine that the stop events are unrelated responsive to receiving trailer hook events from both loads, receiving trailer unhook events from both loads, or receiving a trailer hook event from the second load prior to receiving a trailer unhook event from the first load.

Having described various methods and embodiments, consider the following example. Referring back to FIG. 1, assume that the first load 102a is transported along the first leg of its itinerary from Florida to New York. The first leg includes transportation from Florida to North Carolina. The trailer including the cargo will then be unhooked from the first transportation vehicle and hooked to the second transportation vehicle, which will transport the trailer from North Carolina to its destination in New York. The first transportation vehicle includes the location tracking device 104a, which transmits its location to the central computing device 106 approximately every five (5) minutes. Similarly, the second transportation vehicle includes the location tracking device 104b, which transmits its location to the central computing device 106 approximately every five (5) minutes.

The first load 102a arrives at a predetermined location for the transportation relay. The predetermined location may be, for example, a dock, a warehouse, or a rest stop. Upon arrival at the predetermined location, the location tracking device 104a continues to transmit the location of the first load 102a, and the central computing device 106 receives the same location from the location tracking device 104a at least twice. The relay detection module 202 receives the location information and, upon receiving the same location multiple times, determines that a stop event has occurred. In order to determine that the stop event has occurred, the relay detection module 202 implements method 400, for example. The central computing device 106 may further record or track a time for the stop event. In this particular example, the central computing device 106 records an elapsed time for the stop event, from the point in time at which the same location was received from the location tracking device 104a until a different location is received from the location tracking device 104a.

Meanwhile, the second load 102b arrives at the predetermined location for the transportation relay. Upon arrival at the predetermined location, the location tracking device 104b continues to transmit the location of the second load 102b, and the central computing device 106 receives the same location from the location tracking device 104b at least twice. The relay detection module 202 receives the location information, and upon receiving the same location multiple times, determines that a stop event has occurred. The central computing device 106 records an elapsed time for the stop event of the second load 102b, from the point in time at which the same location was received from the location tracking device 104b until a different location is received from the location tracking device 104b.

The relay detection module 202 then determines whether the stop event for the first load 102a is within a predetermined proximity of the stop event for the second load 102b and whether the stop event for the first load 102a and the stop event for the second load 102b overlap in time. Because the first load 102a and the second load 102b are stopped within 20 meters of one another and because the stop events overlap in time, the relay detection module 202 determines that a transportation relay has occurred. The relay detection module 202 then updates the route information for each of the first and second loads to indicate the time and location of the transportation relay. The relay detection module 202 also updates an estimated time of arrival (ETA) of the second load 102b to its destination in New York. Alternatively, the route management module 204 may update the ETA. For example, if the transportation relay was originally scheduled to occur at 1:00 PM and did not occur until 2:30 PM because one or both of the loads were delayed in traffic, the ETA can be updated to reflect that the trailer and associated cargo will be arriving an hour and a half later than originally planned. The updated ETA may enable other routes to be adjusted accordingly. For example, transportation vehicles waiting for freight on the trailer may be further delayed, or the freight may be rerouted on a different transportation vehicle when it arrives in New York.

In a variation on the above example, assume that the first load 102a is transported along the first leg of its itinerary from Florida to New York. The first leg includes transportation from Florida to North Carolina. The trailer will then be unhooked from the first transportation vehicle and hooked to the second transportation vehicle, which will transport the trailer from North Carolina to its destination in New York. The first transportation vehicle includes the location tracking device 104a, which transmits its location to the central computing device 106 approximately every five (5) minutes. Similarly, the second transportation vehicle includes the location tracking device 104b, which transmits its location to the central computing device 106 approximately every five (5) minutes.

The first load 102a arrives at a predetermined location for the transportation relay. The predetermined location may be, for example, a dock, a warehouse, or a rest stop. Upon arrival at the predetermined location, the location tracking device 104a continues to transmit the location of the first load 102a, and the central computing device 106 receives the same location from the location tracking device 104a at least twice. The relay detection module 202 receives the location information and, upon receiving the same location multiple times, determines that a stop event has occurred. In order to determine that the stop event has occurred, the relay detection module 202 implements method 400, for example. The central computing device 106 may further record or track a time for the stop event. In this particular example, the central computing device 106 records an elapsed time for the stop event, from the point in time at which the same location was received from the location tracking device 104a until a different location is received from the location tracking device 104a.

Meanwhile, the second transportation vehicle is delayed in traffic and is running approximately six (6) hours behind schedule. The central computing device 106 determines that the trailer including the cargo should not be left at the transportation relay point until the second transportation vehicle can arrive. However, the central computing device 106 also determines that a third transportation vehicle is approximately one hour away and is heading toward the location of the stop event of the first load 102a and will continue on in the direction of New York. Accordingly, the central computing device 106 provides instructions to the third transportation vehicle to pick up the trailer at the location of the stop event for the first load 102a. The central computing device 106 may also update the route information for both the second and third transportation vehicles to indicate that the third transportation vehicle will be transporting the trailer instead of the second transportation vehicle.

Upon arrival at the predetermined location, the location tracking device associated with the third transportation vehicle continues to transmit the location of the third load, and the central computing device 106 receives the same location from the location tracking device at least twice. The relay detection module 202 receives the location information, and upon receiving the same location multiple times, determines that a stop event has occurred. The central computing device 106 records a time for the stop event of the third load. In this particular example, the central computing device 106 records an elapsed time for the stop event, from the point in time at which the same location was received from the location tracking device until a different location is received from the location tracking device associated with the third transportation vehicle.

The relay detection module 202 then determines whether the stop event for the first load 102a is within a predetermined proximity of the stop event for the third load and whether the stop event for the first load 102a and the stop event for the third load overlap in time. Because the first load 102a and the third load are stopped within 20 meters of one another and because the stop events overlap in time, the relay detection module 202 determines that a transportation relay has occurred. The relay detection module 202 then updates the route information for the third load to indicate the time and location of the transportation relay. The relay detection module 202 also updates an estimated time of arrival (ETA) of the third load to its destination in New York. Alternatively, the route management module 204 may update the ETA.

In yet another variation on the above example, assume that the first load 102a is transported along the first leg of its itinerary from Florida to New York. The first leg includes transportation from Florida to North Carolina. The trailer including the cargo will then be unhooked from the first transportation vehicle and hooked to the second transportation vehicle, which will transport the trailer from North Carolina to its destination in New York. The first transportation vehicle includes the location tracking device 104a, which transmits its location to the central computing device 106 approximately every five (5) minutes. Similarly, the second transportation vehicle includes the location tracking device 104b, which transmits its location to the central computing device 106 approximately every five (5) minutes.

The first load 102a arrives at a predetermined location for the transportation relay. The predetermined location may be, for example, a dock, a warehouse, or a rest stop. Upon arrival at the predetermined location, the location tracking device 104a continues to transmit the location of the first load 102a, and the central computing device 106 receives the same location from the location tracking device 104a at least twice. The relay detection module 202 receives the location information and, upon receiving the same location multiple times, determines that a stop event has occurred. In order to determine that the stop event has occurred, the relay detection module 202 implements method 400, for example.

Meanwhile, the second load 102b arrives at the predetermined location for the transportation relay. Upon arrival at the predetermined location, the location tracking device 104b continues to transmit the location of the second load 102b, and the central computing device 106 receives the same location from the location tracking device 104b at least twice. The relay detection module 202 receives the location information, and upon receiving the same location multiple times, determines that a stop event has occurred.

The relay detection module 202 then determines whether the stop event for the first load 102a is within a predetermined proximity of the stop event for the second load 102b. Because the first load 102a and the second load 102b are stopped within 20 meters of one another, the relay detection module 202 determines that a transportation relay has occurred. The relay detection module 202 then updates the route information for each of the first and second loads to indicate the time and location of the transportation relay. The relay detection module 202 also updates an estimated time of arrival (ETA) of the second load 102b to its destination in New York. Alternatively, the route management module 204 may update the ETA. For example, if the transportation relay was originally scheduled to occur at 1:00 PM and did not occur until 2:30 PM because one or both of the loads were delayed in traffic, the ETA can be updated to reflect that the trailer and associated cargo will be arriving an hour and a half later than originally planned. The updated ETA may enable other routes to be adjusted accordingly. For example, transportation vehicles waiting for freight on the trailer may be further delayed, or the freight may be rerouted on a different transportation vehicle when it arrives in New York.

Various embodiments enable a transportation relay to be detected or identified without requiring input from a driver. Accordingly, transportation relays may be determined to have occurred and logged while a driver is completing other tasks associated with the transportation relay, such as hooking or unhooking the trailer, confirming the next location in the route, or the like. Additionally, various embodiments enable route information for loads to be automatically updated responsive to a determination that a transportation relay has occurred. Automatic updating of route information may enable various system users to access real-time information regarding routes for loads.

It should now be understood that the systems and methods described herein may be used to automatically determine that a transportation relay has occurred. This determination may be made at least in part on received location information for one or more loads.

While particular embodiments and aspects of the present invention have been illustrated and described herein, various other changes and modifications may be made without departing from the spirit and scope of the invention. For example, various steps in the methods depicted in FIGS. 3-5 may be performed in various orders. Moreover, although various inventive aspects have been described herein, such aspects need not be utilized in combination. It is therefore intended that the appended claims cover all such changes and modifications that are within the scope of this invention.

What is claimed is:

1. A system for determining that a transportation relay has occurred, the system comprising:
    a first tracking device configured to track a location of a first load;
    a second tracking device configured to track a location of a second load; and
    a central computing device, the central computing device configured to:
        receive the location of the first load from the first tracking device;
        identify a stop event for the first load based on the location of the first load;
        receive the location of the second load from the second tracking device;
        identify a stop event for the second load based on the location of the second load;
        determine that the stop event for the first load and the stop event for the second load are within a predetermined proximity;
        determine that the stop event for the first load and the stop event for the second load occur within a predetermined time period; and
        determine that the transportation relay has occurred.

2. The system of claim 1, the central computing device being further configured to:
    confirm that the stop event for the first load and the stop event for the second load are related based at least in part on a route for the first load and a route for the second load.

3. The system of claim 1, the central computing device being further configured to:
    provide an output responsive to determining that the transportation relay has occurred.

4. The system of claim 3, wherein the output comprises information regarding a shipment identification, a route identification, a location of the transportation relay, or a time of the transportation relay.

5. The system of claim 1, wherein the first tracking device and the second tracking device comprise GPS receivers.

6. The system of claim 1, the location of the first load being a first location of the load, the central computing device being further configured to:
    receive a second location of the first load from the first tracking device; and wherein identifying the stop event for the first load comprises determining that the first location of the first load and the second location of the first load are substantially the same.

7. The system of claim 1, the central computing device being further configured to:
    receive information regarding a trailer hook or a trailer unhook event for one of the first load and the second load;
    wherein determining that the transportation relay has occurred is based at least in part on the received information regarding the trailer hook or the trailer unhook event.

8. The system of claim 1, wherein the location of the first load and the location of the second load are determined using cellular network triangulation.

9. The system of claim 1, wherein the central computing device is further configured to update an estimated time of arrival for at least one of the first and second loads responsive to determining that the transportation relay has occurred.

10. A method for determining that a transportation relay has occurred executed by a central computing device comprising:
    receiving a location of a first load from a first tracking device;
    identifying a stop event for the first load based on the location of the first load;
    receiving a location of a second load from a second tracking device;
    identifying a stop event for the second load based on the location of the second load;
    determining that the transportation relay has occurred responsive to determining that the stop event for the first load and the stop event for the second load are within a predetermined proximity; and
    determining that the stop event for the first load and the stop event for the second load occur within a predetermined time period.

11. The method of claim 10, further comprising:
    comparing the location of the first load with the location of the second load to determine whether the stop event for the first load and the stop event for the second load are within the predetermined proximity.

12. The method of claim 10, further comprising:
    receiving a route for the first load;
    receiving a route for the second load; and
    confirming that the stop event for the first load and the stop event for the second load are related based at least in part on the received routes.

13. The method of claim 10, further comprising:
    providing an output responsive to determining that the transportation relay has occurred.

14. The method of claim 10, wherein the first location tracking device and the second location tracking device comprise GPS receivers.

15. The method of claim 10, further comprising:
    storing information regarding a time or a location of the transportation relay in a database.

16. The method of claim 10, further comprising:
    updating an estimated time of arrival for at least one of the first and second loads responsive to determining that the transportation relay has occurred.

17. A computer-implemented method executed by a central computing device comprising:
    receiving location data pertaining to a first load from a first tracking device;
    identifying a stop event for the first load based on the location data pertaining to the first load;
    receiving location data pertaining to a second load from a second tracking device;
    identifying a stop event for the second load based on the location data pertaining to the second load;
    determining a distance between the stop event for the first load and the stop event for the second load;
    determining a time period between the stop event for the first load and the stop event for the second load; and
    determining that the transportation relay has occurred responsive to determining that the distance between the stop event for the first load and the stop event for the second load is less than a predetermined threshold distance and responsive to determining that the time period between the stop event for the first load and the stop event for the second load is less than a predetermined threshold time period.

18. The computer-implemented method of claim 17, further comprising:
receiving route information for the first load;
receiving route information for the second load; and
confirming that the stop event for the first load and the stop event for the second load are related based at least in part on the received route information for the first and second load.

19. The computer-implemented method of claim 17, further comprising:
providing an output responsive to determining that the transportation relay has occurred.

20. The computer-implemented method of claim 19, wherein the output comprises information regarding a shipment identification, a route identification, a time of the transportation relay, or a location of the transportation relay.

21. The computer-implemented method of claim 17, further comprising:
storing information regarding a time or a location of the transportation relay in a database.

22. The computer-implemented method of claim 17, further comprising:
updating route information for at least one of the first and second loads responsive to determining that the transportation relay has occurred.

23. The computer-implemented method of claim 22, wherein updating the route information comprises updating an estimated time of arrival.

24. The computer-implemented method of claim 17, further comprising:
receiving information regarding a trailer hook or a trailer unhook event for one of the first load and the second load;
wherein determining that the transportation relay has occurred is based at least in part on the received information regarding the trailer hook or the trailer unhook event.

* * * * *